United States Patent [19]

Tsutsumi

[11] 4,417,125

[45] Nov. 22, 1983

[54] LASER PROCESSING MACHINE

[75] Inventor: Akira Tsutsumi, La Mirada, Calif.

[73] Assignee: Amada Engineering & Service Co., Inc., La Mirada, Calif.

[21] Appl. No.: 350,416

[22] Filed: Feb. 19, 1982

[30] Foreign Application Priority Data

Feb. 24, 1981 [JP] Japan .................................. 56/25023

[51] Int. Cl.³ ............................................ B23K 27/00
[52] U.S. Cl. ........................ 219/121 LY; 219/121 FS
[58] Field of Search ................. 219/121 LG, 121 LN, 219/121 LY, 121 FS, 121 L, 121 LM, 121 LC, 121 LD

[56] References Cited

U.S. PATENT DOCUMENTS

| 3,740,524 | 6/1973 | Dahlberg et al. | 219/121 LJ |
| 4,063,059 | 12/1977 | Brolund et al. | 219/121 PP |
| 4,167,662 | 9/1979 | Steen | 219/121 FS X |
| 4,324,972 | 4/1982 | Furrer et al. | 219/121 FS |

Primary Examiner—C. L. Albritton
Attorney, Agent, or Firm—Wigman & Cohen

[57] ABSTRACT

The present invention relates to a laser processing machine. A table supports a workpiece to be processed at a work area. A processing head assembly is arranged above the table. A nozzle is connected at a lower end of the processing head assembly and applies a laser beam to the workpiece together with an assisting gas at the work area. A device is provided at the work area for supplying air to keep the workpiece to be processed afloat while the laser beam is being applied to the workpiece together with the assisting gas. A similar device is provided at the lower end of the processing head assembly for supplying air to keep the workpiece to be processed from going up into contact with the processing head assembly while the laser beam is being applied to the workpiece together with the assisting gas. These devices for supplying air include a plurality of air chambers.

4 Claims, 4 Drawing Figures

1

LASER PROCESSING MACHINE

BACKGROUND OF THE INVENTION

1. Field of the Invention

The present invention relates to laser processing machines which can process sheet-like workpieces such as sheet metals by various methods such as cutting and piercing by use of laser beams produced by laser generators.

2. Description of the Prior Art

As is well-known, laser beams are widely used in industries to process a variety of materials, and they are used in the metal processing field to cut and pierce sheet-like workpieces such as sheet metals. Generally, a laser processing machine for processing sheet-like workpieces comprises a processing head assembly having a mirror and a focussing lens to focus and apply the laser beam from a laser generator to a workpiece to be processed and a work-table on which the workpiece is horizontally placed and moved to be processed. In laser processing, the laser beam which is generated by the laser generator is focussed and applied to the workpiece by the processing head assembly together with an exothermically reacting assisting gas such as oxygen gas ($O_2$) so as to melt the workpiece. The assisting gas serves to enhance the processing action of the laser beam and remove slags and drosses or debris molten from the workpiece being processed and also to protect the face of the focussing lens from backscattered materials or metals. Also, the laser processing machine is preferably provided with a sucking means such as a vacuum pump for downwardly sucking the slags and drosses or debris which will be molten from the workpiece being produced.

With regard to the laser processing machine, one of the conventional disadvantages had been that the workpieces to be processed are liable to be scratched and damaged when horizontally moved on the work-table into and out of the processing area just beneath the processing head assembly. Although workpieces to be processed will be inevitably damaged more or less generally in any machines when moved on work-tables, the workpieces will be liable to be heavily damaged by the work-table in laser processing for several reasons. In laser processing, the workpieces will be heavily damaged by the work-table originally since they are pressed onto the work-table by the assisting gas which is kept blowing onto the workpiece during processing. Also they will be much more heavily damaged when they are pulled onto the work-table by a sucking means such as a vacuum pump for sucking the slags and drosses or debris. Furthermore, the workpieces to be processed in laser processing will be much more damaged by the slags and drosses or debris which will be produced molten form from the workpieces and will come to stick onto the work-table. Thus, it has been very disadvantageous in the laser processing machine that the workpieces will be damaged and spoiled in appearance in spite of the fact that the laser beam is used generally with a view of making accurate and fine cuttings.

Another conventional disadvantage with regard to the laser processing machine has been that the drosses or debris produced from the workpiece being processed are liable to ooze out and spread onto the underside of the workpiece from the kerf formed by the laser beam and will scratch and damage the work-table when the workpiece is moved there on. Accordingly, in this regard it has been disadvantageous that the workpiece will not only damage the work-table but also it cannot be freely and smoothly moved on the work-table because of friction between the workpiece and the work-table.

SUMMARY OF THE INVENTION

It is a general object of the present invention to provide a novel laser processing machine which is provided with a workpiece floating means to keep a workpiece to be processed afloat during a processing operation.

It is therefore an important object of the present invention to provide a laser processing machine which will not damage or scratch a workpiece being processed during an operation.

It is therefore another object of the present invention to provide a laser processing machine which will not be damaged by a workpiece being processed.

It is a still further object of the present invention to provide a laser processing machine in which a workpiece to be processed can be freely and smoothly moved to be processed with less force.

In order to accomplish these objects, the laser processing machine according to the present invention is provided at its processing zone with means for supplying air to keep the workpiece afloat during a processing operation.

Other objects and advantages of the present invention will be apparent from the following description and accompanying drawings which, by way of illustration, show preferred embodiments of the present invention and the principles thereof.

DESCRIPTION OF THE PREFERRED EMBODIMENTS

Figure 1:
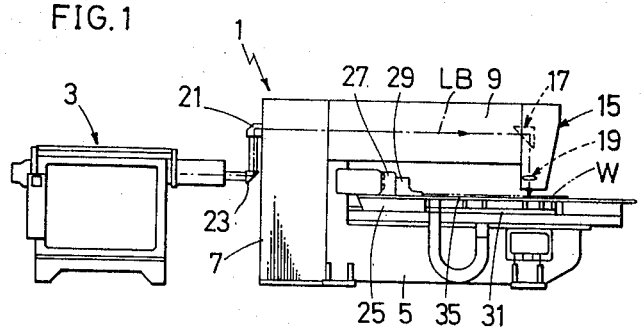
FIG. 1 is a side elevational view of a laser processing machine embodying the principles of the present invention.
Figure 2:
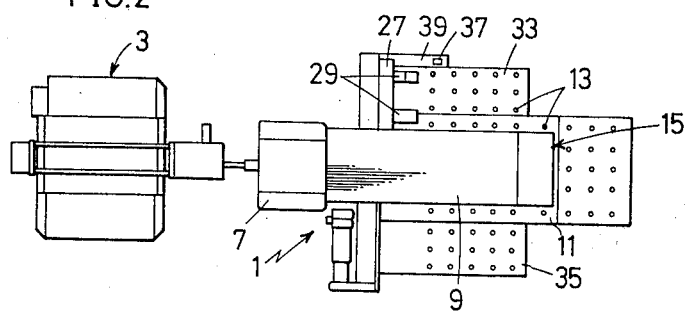
FIG. 2 is a plan view of the laser processing machine shown in FIG. 1.

Referring now to FIGS. 1 and 2, there is shown a laser processing machine which is generally designated by the numeral 1 and is connected with a laser generator 3 such as a $CO_2$ (carbon dioxide gas) laser generator. The laser generator 3 may be a commercially available one, and it is so arranged as to produce laser beam LB and deliver it to the laser processing machine 1 as shown by the arrow in FIG. 1.

The laser processing machine 1 comprises a base 5, a post 7 vertically fixed to one end of the base 5 and an overhead beam 9 horizontally supported over the base 5 by the post 7 in a cantilever manner. The base 5 is provided at its top with a fixed table 11 having a number of slide balls 13 on which a workpiece W such as a sheet metal is horizontally placed to be processed. The overhead beam 9 is provided at its forward end with a processing head assembly 15 which includes a mirror assembly 17 and a focussing lens 19. The mirror assembly 17 is arranged to reflect the laser beam LB delivered from the laser generator 3 toward the workpiece W, through the focussing lens 19 and two more mirror assemblies 21 and 23 are provided to transmit the laser beam LB from the laser generator 3 to the mirror assembly 17 in the preferred embodiment. Thus, the laser processing machine 1 of the above construction is so arranged as to receive the laser beam LB from the laser generator 3 and apply the laser beam LB to the workpiece W through the processing head assembly 15 as shown by the arrow in order to process the workpiece W.

In order to feed and position the workpiece W to be processed, the laser processing machine 1 is provided with a first carriage 25 horizontally movable and a second carriage 27 slidably mounted on the first carriage 25 and holding a plurality of clamping means 29 for clamping the workpiece W. The first carriage 25 is slidably mounted on a pair of rails 31 which are fixed on the upper portion of the fixed table 11 in parallel with each other so that it may be moved toward and away from the processing zone just beneath the processing head assembly 15 when driven by power. The second carriage 27 holding the clamping means 29 is mounted on the first carriage 25 so that it may be horizontally moved by power at right angles with the rails 31. The clamping means 29 are detachably and adjustably fixed to the second carriage 27 so that they may be adjusted according to the width of the workpiece W to be processed. Also, in order to hold the extending ends of the workpiece W, a pair of movable tables 33 and 35 having a number of slide balls 13 may be fixed to the first carriage 25 so that they can be moved together with the workpiece W by the first carriage 25. Furthermore, in order to initially position the workpiece W on the fixed table 11, a retractable stopper means 37 is provided on an arm member 39 which is horizontally fixed to a portion of the laser processing machine 1. Thus, the workpiece W can be initially positioned on the fixed table 11 when it is clamped with its end held in contact with the stopper means 37 by the clamping means 29 which has been placed by the first carriage 25 at the original location near the post 7.

In the above described arrangement, the workpiece W can be cut and pierced by the laser beam LB when it is positioned just beneath the processing head assembly 15 on the fixed table 11 by the first and second carriages 25 and 27. Of course, the laser beam LB, which is produced by the laser generator 3, is delivered into the processing head assembly 15 and directed downwardly by the mirror assembly 17 as shown by the arrow and then applied to the workpiece W through the focussing lens 19 together with an assist gas such as oxygen gas. Also, it will be readily understood by those skilled in the art that the first and second carriages 25 and 27 can be automatically and continuously moved under a numerical control which is programmed.

Figure 3:
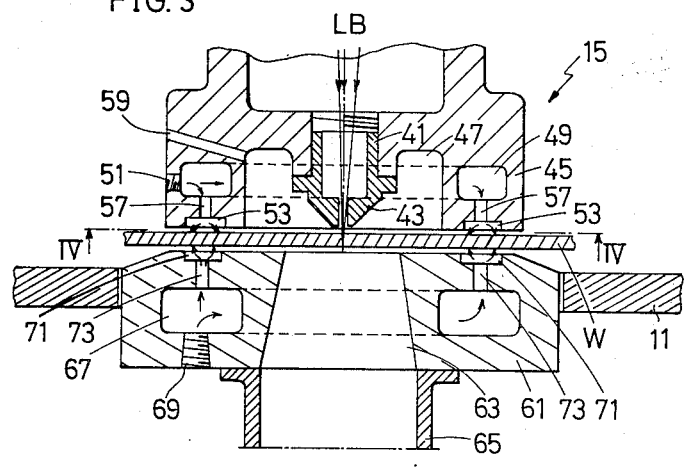
FIG. 3 is a greatly enlarged detailed vertical sectional view showing a front portion of the laser processing machine shown in FIGS. 1 and 2.
Figure 4:
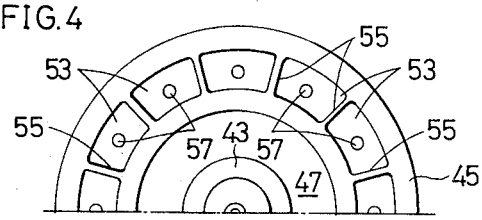
FIG. 4 is a sectional view taken along the line IV—IV of FIG. 3.

Referring to FIGS. 3 and 4, the processing head assembly 15 is formed at its lower end with a vertical bore 41 in which a nozzle means 43 is detachably inserted so that the laser beam LB can be vertically downwardly applied therethrough to the workpiece W to be processed together with the assisting gas. Also, the laser processing assembly 15 is provided at its lower end with annular flange-like portion 45 which is downwardly projected lower than the nozzle means 43 just like an inverted cup in such a manner as to provide a circular recess 47 and encircle the nozzle means 43.

The annular portion 45 of the lower end of the processing head assembly 15 is formed with an annular air passage 49 which is provided with an air port 51 and is connected to an air source through the port 51 so as to be supplied with air for a purpose to be seen hereinafter. Also, the annular portion 45 is further formed at its lower end with a plurality of air chambers 53 which are downwardly open in a circle and are separated from each other by partitions 55 as shown in FIG. 4. Each of the air chambers 53 is connected to the annular air passage 49 by a passage 57 so that the air which is supplied into the annular air passage 49 through the port 51 from the air source can be supplied into the air chambers 53. In this connection, each of the passages 57 is so designed as to be as small as possible in diameter in comparison with the horizontal section of each air chamber 53 so that the air can pass through the annular air passage 49 so as to equally pass into all the air chamber 53. Also, the circular recess 47 is provided with a passage 59 which is made outwardly open so that the air coming thereinto can be exhausted to the atmosphere without preventing the assisting gas from coming out of the nozzle means 43.

In the above described arrangement, when the air is being supplied into the annular passage 49 through the port 51, the workpiece W to be processed will be stopped by the air from going up into contact with the lower end with the processing head assembly 15 and therefore it could not damage the processing head assembly 15 when moved on the fixed table 11. Also, it will be understood that the air blowing out of the air chambers 53 will urge the workpiece W downwardly even if the workpiece W is partially placed just beneath the processing head assembly 15. Some of the air chambers 53 will be opened to the atmosphere since the passages 57 are the smallest possible in diameter so as to enable the air to pass throughout the annular air passage 49.

As is shown in FIG. 3, an annular member 61 having a bore 63 is horizontally mounted just beneath the processing head assembly 15 in the fixed table 11 in such a manner that the bore 63 is disposed in vertical alignment with the nozzle means 43. The arrangement is such that the top surface of the annular member 61 is substantially on a level with the top surface of the fixed table 11 so that the workpiece W to be cut can be horizontally moved thereon. Also, the annular member 61 is provided at its underside with a pipe member 65 which is vertically disposed in vertical alignment with the bore 63 so that the slags and the drosses or debris produced in molten form from the workpiece W being processed can drop therethrough. The pipe member 65 may be connected with a vacuum pump so as to positively suck the slags and the drosses or debris together with the assisting gas which is jetted from the nozzle means 43 of the processing head assembly 15. In this arrangement, when the laser beam LB is applied together with the assisting gas from the nozzle means 43 onto the workpiece W placed on the fixed table 11 and the annular member 61, the workpiece W is cut or pierced by the laser beam LB and slags and the drosses or debris produced from the workpiece W will drop or be sucked into the pipe member 65 through the bore 63 of the annular member 61.

The annular member 61 is formed with an annular air passage 67 which is connected to an air source through an air port 69 more or less in the same manner as the annular portion 45 of the processing head assembly 15.

Also, the annular member 61 is further formed at its top surface with a plurality of air chambers 71 which are upwardly open in a circle in a manner similar to the air chambers 53 of the annular portion 45 of the processing head assembly 15. Each of the air chambers 71 is connected to the annular air passage 67 by a passage 73 which is so designed as to be as small as possible in diameter in comparison with the horizontal section of each air chamber 71.

In the above described arrangement, when the air is being supplied into the annular air passage 67 from the port 69, the workpiece W to be processed will be kept afloat by the air out of contact with the annular member 61 and the fixed table 11 and therefore it could not be damaged when moved thereon to be processed. Also, the workpiece W can be kept in a raised condition by the air even when partially placed just beneath the processing head assembly 15 with only some of the air chambers 71 opened to the atmosphere since the passages 73 are as small as possible in diameter so as to enable the air to pass throughout the annular air passage 67.

As has been so far described above, the workpiece W to be processed is kept afloat by the air out of contact with the laser processing machine 1 when it is moved on the fixed table 11. Accordingly, the workpiece W could not be scratched or damaged by any portions of the laser processing machine 1 or by the slags and the drosses or debris on the work-table 11. Also, it could not damage any portions of the machine 1 when moved on the fixed table 11 to be processed. Also, the workpiece W can be freely and smoothly moved on the fixed table 11 with less force whether or not the slags and the drosses or debris are on the fixed table 11 or have stuck to the underside of the workpiece W.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A laser processing machine, comprising:
   a table means for supporting a workpiece to be processed at a work area;
   a processing head assembly arranged above the table means;
   a nozzle means, connected at a lower end of the processing head assembly, for applying a laser beam to the workpiece together with an assisting gas at the work area; and
   means, provided at the work area, for supplying air to both sides of the workpiece in order to keep the workpiece to be processed in a floated position out of contact with the table means and with the processing head assembly while the laser beam is being applied to the workpiece together with the assisting gas.

2. The laser processing machine, according to claim 1, wherein:
   said air supplying means includes means, provided at the lower end of the processing head assembly, above the work-piece for supplying air to the top side of the workpiece in order to keep the workpiece to be processed out of contact with the processing head assembly while the laser beam is being applied to the workpiece together with the assisting gas.

3. The laser processing machine, according to claim 2, wherein:
   said air supplying means further includes means, provided in the table means below the workpiece, for supplying air to the underside of the workpiece in order to keep the workpiece to be processed afloat out of contact with the table means while the laser beam is being applied to the workpiece together with the assisting gas.

4. The laser processing machine, according to claim 3, wherein:
   said means for supplying air include a plurality of air chambers.

* * * * *